(12) United States Patent
Holvoet et al.

(10) Patent No.: US 8,523,112 B2
(45) Date of Patent: Sep. 3, 2013

(54) DEVICE FOR HOLDING AN INSULATING BLANKET AND FOR FASTENING SYSTEMS ADAPTED TO BE MOUNTED IN AN AIRCRAFT

(75) Inventors: Julie Holvoet, Toulouse (FR); Matthieu De Kergommeaux, Toulouse (FR); Jean-Claude Briois, Plaisance du Touch (FR); Luc Michelet, Cornebarrieu (FR)

(73) Assignee: Airbus Operations S.A.S., Toulouse (FR)

( * ) Notice: Subject to any disclaimer, the term of this patent is extended or adjusted under 35 U.S.C. 154(b) by 150 days.

(21) Appl. No.: 13/165,461

(22) Filed: Jun. 21, 2011

(65) Prior Publication Data

US 2011/0309197 A1    Dec. 22, 2011

(30) Foreign Application Priority Data

Jun. 22, 2010 (FR) .................................. 10 02611
Aug. 10, 2010 (FR) .................................. 10 03324

(51) Int. Cl.
*B64C 1/40* (2006.01)
*F16B 1/00* (2006.01)

(52) U.S. Cl.
USPC .......... 244/131; 244/119; 244/117 R; 248/214

(58) Field of Classification Search
USPC .............. 248/214, 215, 309.1; 244/119, 131, 244/118.1
See application file for complete search history.

(56) References Cited

U.S. PATENT DOCUMENTS

| | | | |
|---|---|---|---|
| 5,680,680 A | 10/1997 | LaConte | |
| 6,193,200 B1 * | 2/2001 | Kao | ............................ 248/309.1 |
| 7,059,565 B2 * | 6/2006 | Scown et al. | ............. 244/117 R |

FOREIGN PATENT DOCUMENTS

| | | |
|---|---|---|
| DE | 10 2007 061 425 A1 | 7/2009 |
| FR | 2 904 804 | 2/2008 |
| WO | WO 2010/004121 A2 | 1/2010 |

OTHER PUBLICATIONS

U.S. Appl. No. 13/165,108, filed Jun. 21, 2011, Holvoet, et al.
French Preliminary Search Report Issued Mar. 17, 2011, in French 1003324, filed Aug. 10, 2010 (with English Translation of Category of Cited Documents).
U.S. Appl. No. 13/165,446, filed Jun. 21, 2011, Sabadie, et al.
U.S. Appl. No. 13/165,115, filed Jun. 21, 2011, Sabadie, et al.
U.S. Appl. No. 13/165,150, filed Jun. 21, 2011, Sabadie, et al.

* cited by examiner

*Primary Examiner* — Tien Dinh
*Assistant Examiner* — Michael Wang
(74) *Attorney, Agent, or Firm* — Oblon, Spivak, McClelland, Maier & Neustadt, L.L.P.

(57) ABSTRACT

A device for holding an insulating blanket and for fastening systems for an aircraft including aircraft frames, a skin, and connecting pieces between the skin and the frames, the connecting pieces including clips, includes two brackets and a member that contours at least a portion of one of the aircraft frames. Each bracket has a first branch configured to be fastened to one of the clips and a second branch provided with a slot. The member that contours at least a portion of one of the aircraft frames includes a base and two arms. Each arm has a free end forming a securing lug configured to be inserted into the slot of one of the brackets with a flange which forms a stop countering displacement of the securing lug once the latter is inserted into the slot. Each arm further includes at least one support configured to accommodate a system.

9 Claims, 4 Drawing Sheets

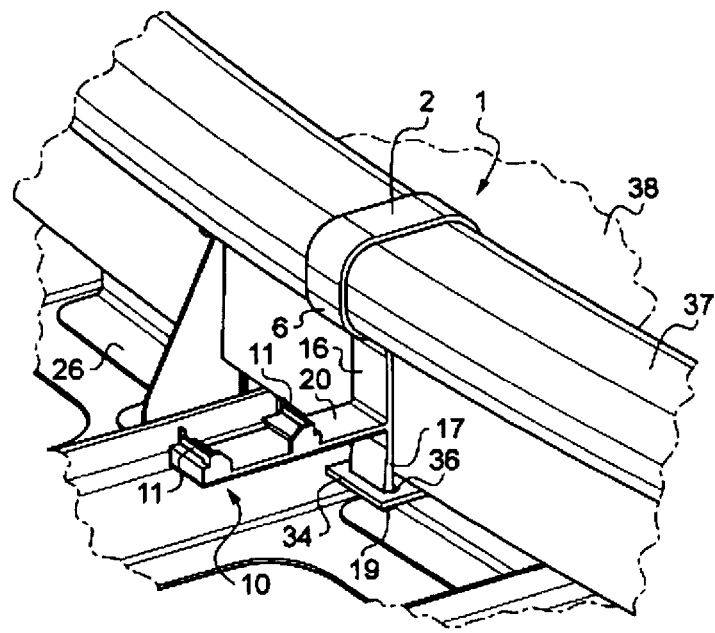
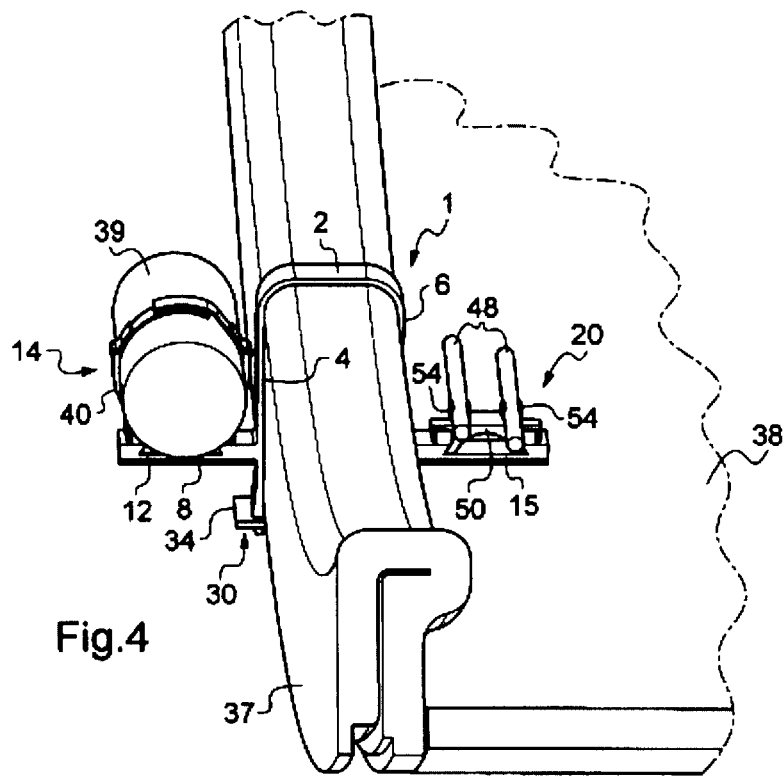

DEVICE FOR HOLDING AN INSULATING BLANKET AND FOR FASTENING SYSTEMS ADAPTED TO BE MOUNTED IN AN AIRCRAFT

This invention relates to a device for holding an insulating blanket and for fastening systems. This invention relates to the aeronautical field and more particularly aircraft construction.

An aircraft fuselage usually has a structure made up of frames and stringers. The exterior shell of the fuselage is fastened onto the frames and stringers. When the aircraft is intended to fly at high altitude, considering the outside temperatures to which it is to be subjected, it is necessary to implement a thermal insulation of the fuselage. It then is known to cover the interior face of the skin forming the shell of the fuselage with insulating blankets in the form of flexible strips or panels. These blankets are called skin blankets. It also is advisable to thermally insulate each frame. There then are used blankets having a structure similar to that of the skin blankets, but the shape of which is adapted for coming to encase the frames inside the fuselage. These blankets hereinafter are called frame blankets.

The frames of the fuselage also serve as supports for various systems. By systems there is understood here equipment items of the aircraft as well as the electrical wirings, the hydraulic systems, the pneumatic systems, the air ducts for ventilation and pressurization inside the fuselage, . . . .

Holes then are made in the frames of the fuselage on the one hand to allow fastening of the insulating blankets and on the other hand to allow support and fastening of systems. These holes weaken the frames and sometimes must be compensated for by structural reinforcements, which thus complicates the design of the aircraft.

Moreover, as regards the blankets, it is advisable to adapt their shape to the various fastening devices provided. Holes, cut-outs, notches, . . . must be provided in the blankets to allow passage of a fastening device, fitting to the structure of the fuselage, . . . . The holes and notches made in the blankets degrade their insulating performance and are sources of thermal (and acoustic) bridges and they thus reduce the performances of the blankets.

It therefore is advisable at the same time to limit the number of holes made in the structure of the aircraft (frame and/or other structural part) as well as in the insulating blankets (skin blankets and frame blankets).

The document FR-2 933 376 thus shows, for example, a device for fastening an insulting blanket and a method for installing an insulating blanket in an aircraft fuselage making it possible to limit the number of holes to be made in the frames of the aircraft. The device described in this document comprises a portion forming a hook adapted for coming to cap a flank of the frame and grip the latter by itself or in cooperation with a structural element of the aircraft so as to ensure fastening of the device to the frame. One embodiment of this device comprises a first frame-blanket clip borne by a first member intended to extend on the first side of the frame, a second frame-blanket clip borne by a second member intended to extend on the second side of the frame, a first skin-blanket clip borne by the first member and a second skin-blanket clip borne by the second member.

This invention then has as a purpose to provide a system allowing on the one hand the holding of insulating blankets and on the other hand the support of systems while at the same time limiting the holes to be made in the structure of the aircraft (frame, . . . ) and on the other hand in the said insulating blankets.

Advantageously, the implementation of such a system will be easy and/or at a limited cost price and/or with a mass as small as possible.

For this purpose, this invention proposes a device for holding an insulating blanket and for fastening systems for an aircraft comprising frames, a skin and connecting parts between the skin and the frames, referred to as clips.

According to this invention, this holding and fastening device comprises:
two brackets, each bracket having a first branch intended to be fastened to a clip of the aircraft and a second branch provided with a slot,
a stirrup-shaped clip comprising a base and two arms, each arm having at its free end a securing lug adapted for being able to be inserted in the slot of one of the said brackets with a flange which forms a stop countering displacement of the securing lug once same is inserted in the said slot, each arm further comprising at least one support for accommodating a system.

In this way, the device according to this invention may come to hold a frame blanket on a frame by clipping it thereto. It also may serve for systems support by virtue of the support that it bears. The device is securely fastened to the structure of the aircraft by virtue of the brackets and the cooperation between the latter and the free ends of the clip.

In a device according to this invention, it may be provided that the base is of elongated shape and defines a plane, referred to as reference plane, and that the arms extend more or less perpendicular to the said reference plane. In this way, one has a simple and easily attainable form for a device according to the invention.

In a preferred embodiment, the base of elongated shape and the arms form only a single piece.

An embodiment variant of a device according to the invention provides that at least one arm bears a ramp extending more or less perpendicular in relation to the arm that bears it, each ramp being intended to accommodate a support.

For a greater adjustability and adaptability of the device according to this invention, at least one support advantageously is a separate part equipped with assembly means, and the stirrup-shaped clip comprises complementary assembly means making it possible to accommodate the said support.

According to an embodiment of the system in which at least one arm bears a ramp, each system support comprises a base adapted for being coupled with a housing arranged on a ramp. Preferably, the housings arranged on the ramps are all identical and the bases of the system supports are all identical, irrespective of the systems to be fastened. Each system support then may be coupled to any one of the housings arranged on a ramp. This characteristic makes the systems interchangeable in terms of position on the ramps.

Preferably, the base of each system support and each of the housings arranged on the ramps have complementary sections and comprise locking means countering displacement of the system support. It is to be noted that the locking means may result from the complementary shape of the base and of the housing, and/or comprise complementary structural means.

The invention also extends to an aircraft comprising at least one device according to the invention and systems fastened with the aid of the said device.

Other details and advantages of this invention will become apparent on reading of the following description, which makes reference to the attached schematic drawings and concerns a preferential embodiment, provided by way of non-limitative example. On these drawings:

FIG. 1 shows a central clip of a device according to the invention without a systems support;

FIG. 2 partially shows a structure in an aircraft intended to accommodate a holding device according to this invention;

FIG. 3 shows in perspective the central clip of FIG. 1 in position in an aircraft;

FIG. 4 is a view in perspective from another angle of the structure of FIG. 2 mounted on the frame;

Figure 1:
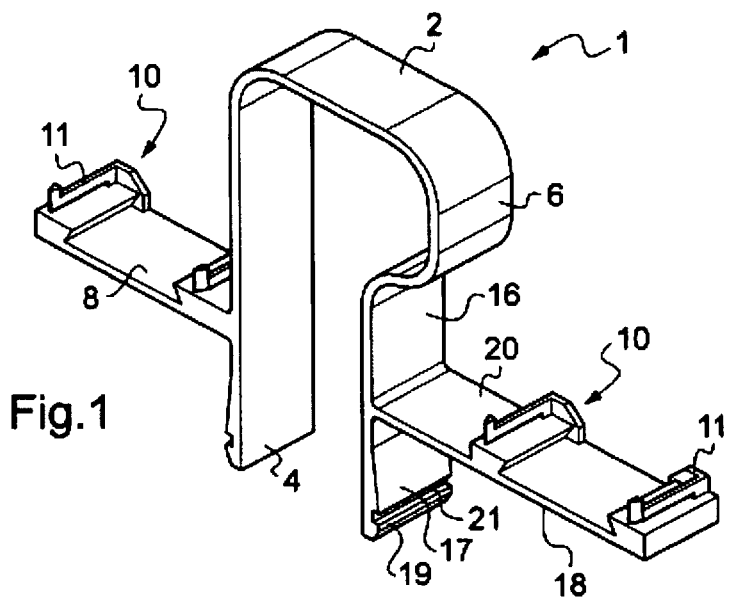

FIG. 1 shows a stirrup-shaped clip 1 comprising a base 2 from which two arms extend. It will be assumed arbitrarily that base 2 extends more or less in a horizontal plane and that the arms extend in a more or less vertical direction, so that one has a first arm 4 and a second arm 6.

First arm 4 is more or less plane. It extends in a more or less vertical plane and is connected to base 2 with a rounding. It comprises a first ramp 8 which extends from first arm 4 parallel to base 2 moving away from second arm 6. This first ramp 8 is of more or less rectangular shape and has on its surface a housing 10 intended for being coupled to a base 12 of a system support 14 presented on FIGS. 4, 5 and 6. Each housing 10 is made up of two slides 11 extending orthogonally to the axial direction of first ramp 8. Each slide 11 is integral with the ramp only over one part (including an end) of its length, referred to as fixed part, the other part of the slide remaining free. The free part of each slide 11 can move away from the other slide by means of elasticity so as to allow insertion of base 12 of the system support.

Second arm 6 has a more complex shape than first arm 4. In a side view, the space between first arm 4 and second arm 6 forms an L, the base of the L being disposed against base 2. Starting from base 2, second arm 6 is therefore first of all relatively far away from first arm 4, then draws closer thereto. Second arm 6 comprises a plane part 16 which corresponds to the close part of first arm 4. Just as for first arm 4, and in symmetrical manner, a second ramp 18 extends from second arm 6 parallel to base 2 moving away from first arm 4. This second ramp 18 comprises a plane part 20 so that second ramp 18 is longer than first ramp 8. Just like first ramp 8, second ramp 18 also comprises a housing 10 intended to be coupled to a second system support 22 presented on FIGS. 3 and 6.

Figure 2:
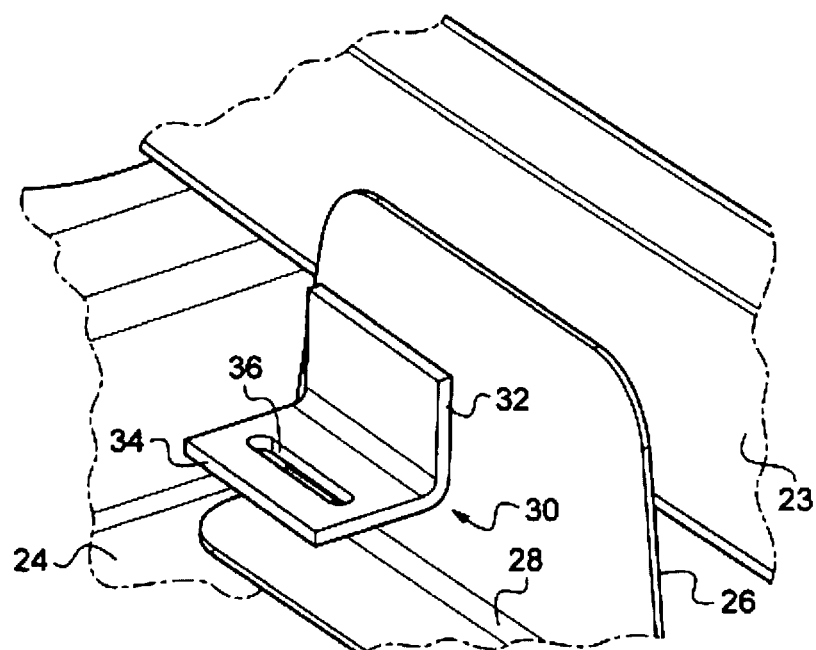

The structure shown on FIG. 2 has a frame 23 onto which a skin 24 is fastened with the aid of parts called clips 26. Each clip has a part forming a bracket 28 to make it possible to connect skin 24 to frame 22.

Stirrup-shaped clip 1 is fastened by each of its free ends to a clip 26. For this purpose, the blanket holding device comprises for each of the free ends of first arm 4 and second arm 6 a bracket 30 such as illustrated on FIG. 2. Each bracket 30 comprises on the one hand a first branch 32 for fastening thereof to a clip 26 of the fuselage; this fastening may be accomplished by bonding of first branch 32 onto clip 26. Each bracket 30 comprises on the other hand a second branch 34 in which the end of the corresponding arm comes to be anchored. For this purpose, second branch 34 has a slot 36, and the end of each arm of stirrup-shaped clip 1 has a securing lug 17 that comes to be inserted into slot 36 of bracket 30 as presented on FIG. 3. This securing lug 17 comprises a flange 19 at its free end. Slot 36 thus has a width at least equal to the thickness of this flange 19 so as to allow insertion of the said flange into the said slot.

In inoperative position, securing lug 17 forms an angle greater than 90° with the horizontal direction of base 2 of stirrup-shaped clip 1. When it is inserted into slot 36 in a position referred to as anchoring (as illustrated in FIG. 3), securing lug 17, which is slightly elastic in bending, extends more or less orthogonally to the horizontal direction. In anchoring position, securing lug 17 therefore is elastically pulled back toward first branch 32 of the bracket. Flange 19 of securing lug 17 then forms a stop countering displacement of the said securing lug. In order to free stirrup-shaped part 1 from bracket 30, it suffices to exert a pressure against securing lug 17 of said stirrup-shaped part 1 in a direction opposite to first branch 32 of the bracket so as to position flange 19 facing slot 36, then to pull on bracket-shaped part 1 in a direction opposite to skin 24 of the fuselage.

Preferably, securing lug 17 furthermore has a shoulder 21 above flange 19, which shoulder 21 forms a stop countering the sinking of securing lug 17 into slot 36 of bracket 30. In other words, flange 19 and shoulder 21 define a notch into which an edge of slot 36 comes to engage when securing lug 17 is in anchoring position.

As may be seen on FIG. 3, an insulating blanket called frame blanket 37 is disposed around frame 23, between the latter and stirrup-shaped clip 1. By virtue of the elasticity of this clip 1, frame blanket 37 is firmly held on frame 23. The stirrup-shaped clip brings about a clamping between its arms 4 and 6.

The presence of insulating blankets against outer skin 24 also is seen on FIG. 3. These insulating blankets are in the form of strips extending between two frames 23 in each instance. Each of these blankets is called skin blanket 38. To ensure a good continuity in the insulation, frame blanket 37 is fastened to each of skin blankets 38 situated on either side of frame 23. A hook-and-loop connection system, better known under the trade name Velcro, may be provided here.

Figure 5:
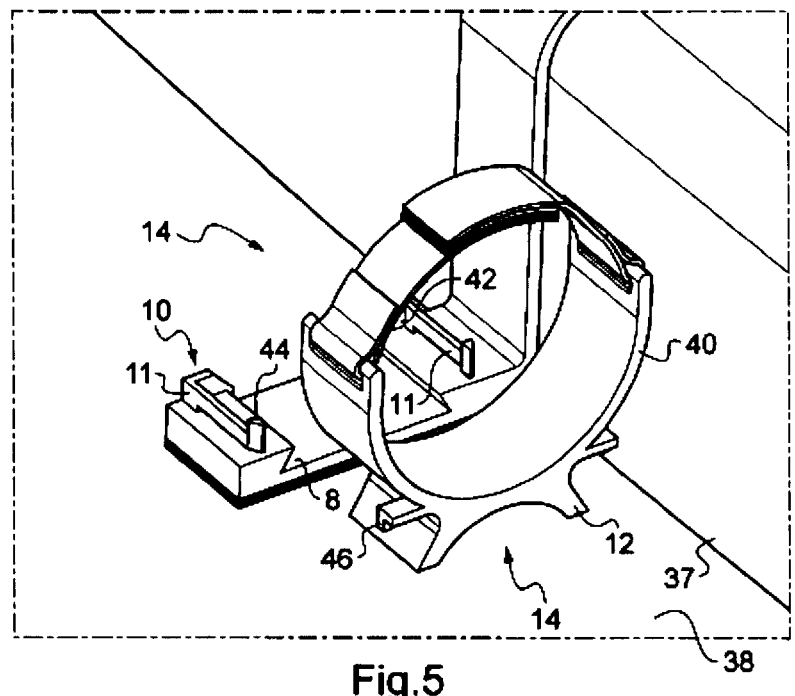
FIGS. 5 and 6 are views in perspective, on an enlarged scale, of a first system support of a device according to the invention.
Figure 6:
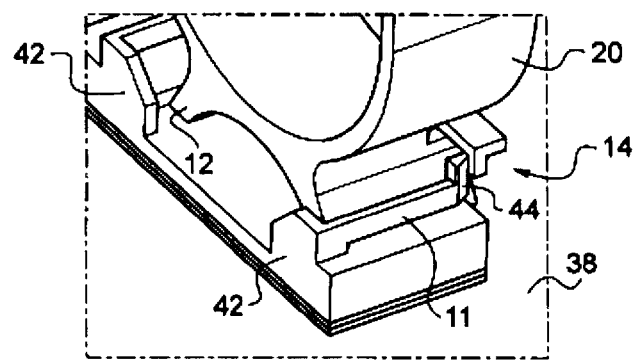

The blanket-holding device according to the invention furthermore comprises system supports. FIGS. 5 and 6 illustrate first system support 14, especially adapted for accommodating a duct 39 for circulation of conditioned air or another duct for fluid (see FIG. 4). This system support 14 comprises on the one hand base 12 for fastening thereof to stirrup-shaped clip 1, and on the other hand a clamp 40, with open circular section, accommodating duct 39.

Clamp 40 has an inside diameter corresponding more or less to the outside diameter of duct 39. It moreover has an elasticity both sufficiently great to allow insertion of duct 39 into the clamp and sufficiently weak to hold the said duct effectively.

Base 12 is adapted for being coupled with one of housings 10 arranged on stirrup-shaped clip 1, preferably with housing 10 situated on flange 8 of first arm 4. The free part of each slide 11 of housing 10 may move away from the other slide by means of elasticity so as to allow insertion of base 12 of the system support into housing 10. At its free end, each slide 11 has a return forming a stop 42 against which base 12 of system support 14 comes to bear when the latter is in fastening position. At its free end, each slide 11 has a locking lug 44 able to cooperate with a locking pin 46 of the system support for locking system support 14 in fastening position. Slides 11, return 42, lug 44 and pin 46 counter displacements of system support 14 relative to stirrup-shaped clip 1 in the plane of the first ramp of its first arm 4. As to displacements of system support 14 orthogonally to the plane of first ramp 8, they are prevented by a slightly dovetail shape of slides 11 and base 12 of the system support. Holding of the duct also is ensured by an adjustable strap 47. Alternatively, the strap may be replaced by a hook-and-loop connection system better known under the trade name Velcro.

Figure 7:
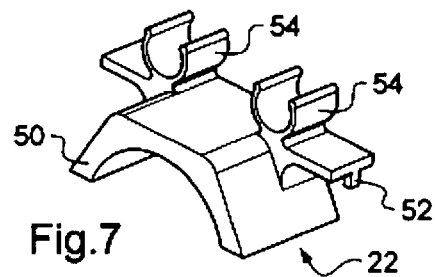
FIG. 7 is a view in perspective of a second system support of a device according to the invention.
Figure 8:
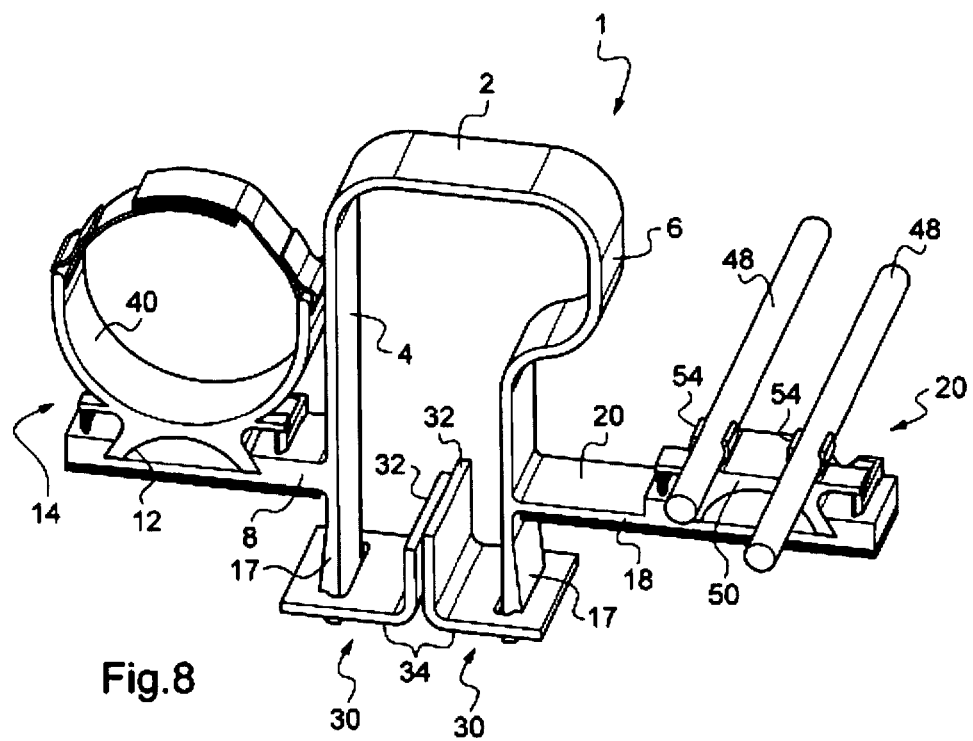
FIG. 8 shows the device of FIG. 4 alone in perspective.

FIGS. 7 and 8 illustrate second system support 22, especially adapted for accommodating two cables 48 or other small-section systems. System support 22 comprises a base 50 identical to base 12 of system support 14, and two locking pins 52 identical to locking pins 46 of system support 14. Like system support 14, system support 22 therefore may be laid out in any one of the arranged housings of stirrup-shaped part 1.

System support 22 further comprises two clamps 54 with circular and open section, for accommodating two cables 48. Each clamp 54 has an inside diameter corresponding more or less to the outside diameter of a cable 48, and an elasticity adapted for allowing insertion and holding of the said cable in the said clamp.

The various devices described above therefore allow holding of an insulating blanket on a frame as well as fastening of systems in relation to the structure of an aircraft.

An advantage of all these devices is that they may be adapted easily in particular as regards fastening of systems. In fact, to the individual skilled in the art, the devices described will appear to be adjustable. For example, an electrical-conduit support may be arranged instead of an air-duct support. It also is possible to adapt the number of conduit/duct supports borne by the device. Moreover, it is seen that the devices described above make it possible to adapt to many solutions for the passing through of supported systems and may support all types of systems, because it suffices to adapt the supports mounted on the ramps to the systems to be fastened. Implementing the housings for system support directly on stirrup-shaped clip 1, or on base 2, or on first arm 4 and/or second arm 6 also could be considered.

The devices according to this invention also have the great advantage of being able to provide supporting of cables and ducts/conduits without having to make holes in or modify the structure of the aircraft. Moreover, it is not necessary to adapt the insulating blankets for installation and mounting of the devices according to this invention.

Mounting of these various devices may be accomplished without tools, or at least without specific tools. These devices also are designed for being able to be easily remounted and dismantled in the same position as prior to dismantling.

Finally, the devices according to this invention are easy and quick to implement. Mounting (and dismantling) time is limited. In addition, if the devices according to the invention are made of synthetic material, it is possible to have devices with reduced weight, which of course is advantageous for a mounting in an aircraft.

This invention is not limited to the embodiments described above by way of non-limitative examples, or to the indicated variants. It also relates to all the embodiment variants within the capacity of the individual skilled in the art in the context of the claims below.

The invention claimed is:

1. A device for holding an insulating blanket and for fastening systems for an aircraft including aircraft frames, a skin, and connecting pieces between the skin and the frames, the connecting pieces including clips, the device comprising:
   two brackets, each bracket having a first branch configured to be fastened to one of the clips and a second branch provided with a slot, and
   a member that contours at least a portion of one of the aircraft frames and that includes a base and two arms, each arm having a free end forming a securing lug configured to be inserted into the slot of one of the brackets with a flange which forms a stop countering displacement of the securing lug once the latter is inserted into the slot, and each arm further including at least one support configured to accommodate a system.

2. The device according to claim 1, wherein the base is of elongated shape and defines a plane, referred to as a reference plane, and the arms extend more or less perpendicular to the reference plane.

3. The device according to one of claims 1 or 2, wherein the base of elongated shape and the arms form only a single part.

4. The device according to claim 1, wherein at least one arm bears a ramp extending more or less perpendicular in relation to the at least one arm which bears the ramp, each ramp being configured to accommodate a support.

5. The device according to claim 1, wherein at least one support is a separate piece equipped with an assembly part, and the member that contours at least a portion of one of the aircraft frames includes a complementary assembly part to accommodate the at least one support.

6. A fastening assembly comprising:
   the device according to claim 4, wherein each system support includes a base configured to be coupled with a housing arranged on the ramp.

7. The fastening assembly according to claim 6, wherein housings arranged on the ramps are all identical and bases of the system supports are all identical, irrespective of the systems to be fastened.

8. The fastening assembly according to one of claims 6 or 7, wherein the base of each system support and each of the housings arranged on the ramps have complementary sections and each includes a lock to counter displacement of the system support.

9. An aircraft comprising:
   at least one device according to claim 1 and systems fastened with the aid of the device.

* * * * *